Feb. 5, 1952     J. L. AASLAND     2,584,180
SNAPPING ROLL WITH MATING SPIRAL RUBBER RIBS
Filed Oct. 29, 1948
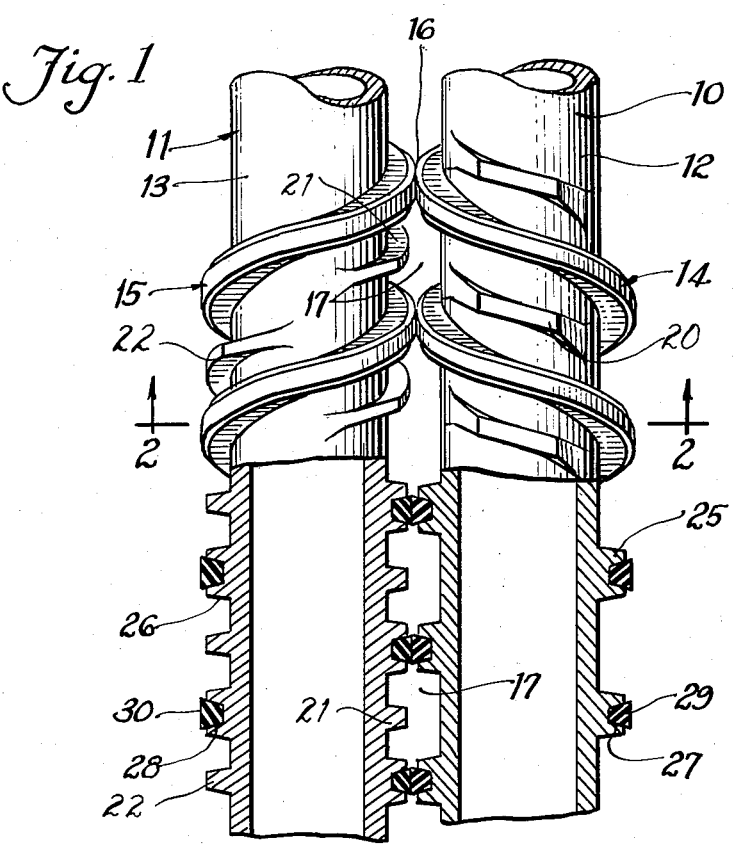
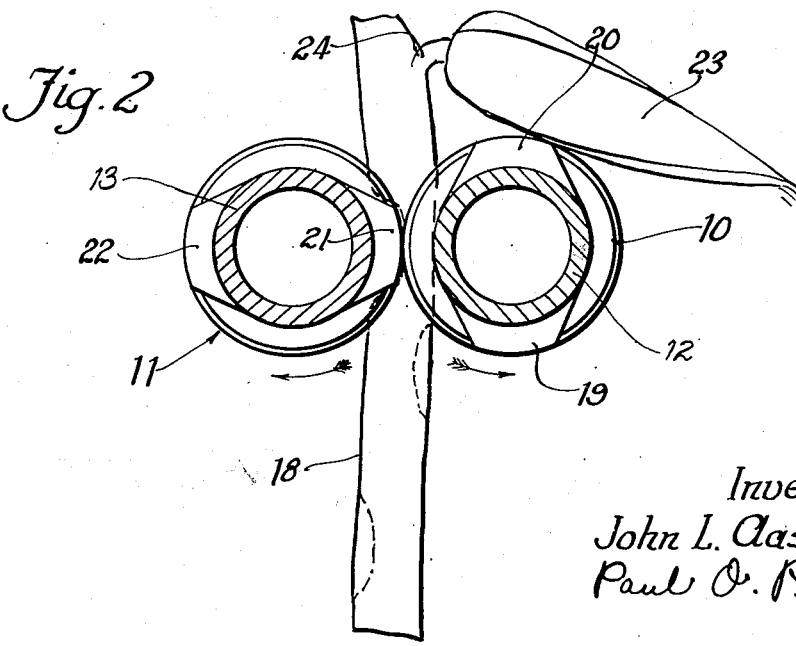
Inventor:
John L. Aasland
Paul O. Pippel
Atty Patented Feb. 5, 1952

2,584,180

UNITED STATES PATENT OFFICE 2,584,180

SNAPPING ROLL WITH MATING SPIRAL RUBBER RIBS

John L. Aasland, Moline, Ill., assignor to International Harvester Company, a corporation of New Jersey Application October 29, 1948, Serial No. 57,311

1 Claim. (Cl. 130—5)

This invention relates to new and improved snapping rolls with mating spiral rubber ribs.

The problems of designing corn snapping rolls are numerous. Many corn picking or corn harvesting machines are now provided with snapping means, but no husking means.

It is therefore a principal object of this invention to provide cooperative corn snapping rolls which will actively husk ears of corn simultaneously with the snapping of the ears from their stalks.

An important object of this invention is to provide means on cooperative snapping rolls for positively forwarding the stalks to prevent crowding or congestion of a number of stalks in one position with respect to the cooperative rolls.

Another important object of this invention is to provide positive snapping rolls and effective means associated therewith for performing a husking of the snapped ears of corn.

Another and still further important object of this invention is to provide cooperative snapping rolls having mating spiral ribs and a continuous rubber insert around the apex of both of said spiral ribs to permit easy adjustment of the rolls one to the other and to compensate for irregularities in the depth of the ribs.

Other and further important objects of this invention will become apparent from the disclosures in the following specification and accompanying drawing.

In the drawing:

Fig. 1 is a top plan view of portions of the cooperative snapping rolls of this invention with a part thereof in section.

Fig. 2 is a sectional view taken on the line 2—2 of Fig. 1 and showing a corn stalk being fed therethrough.

As shown in the drawing the reference numerals 10 and 11 indicate generally cooperative snapping rolls. These rolls include substantially parallel cylindrical portions 12 and 13 respectively having wound thereon and rigidly attached thereto mating spiral ribs 14 and 15. The rib 14 is spiraled in one direction and the rib 15 is spiraled in the opposite direction. The ribs 14 and 15 are adapted for engagement at 16 on a line centrally between the rolls 10 and 11. Adjacent convolutions of adjoining or abutting ribs define a pocket area or space 17 between the rolls 10 and 11 for confining a corn stalk without crushing it and feeding it along the length of the roll by a positive guiding thereof.

As shown in Fig. 2, a corn stalk 18 is shown in one of the pockets 17 and by means of the spiral ribs 14 and 15 the stalk is moved longitudinally of the rolls 10 and 11. Simultaneously with this rearward movement of the stalk rectangularly shaped projections 19, 20, 21 and 22 are adapted to move the stalk downwardly between the rolls 10 and 11. The projections 19 and 20, and the projections 21 and 22 are diametrically opposed on the rolls 10 and 11 respectively. As shown in Fig. 2, the projections 21 and 22 are at right angles to the projections 19 and 20 and the projection 21 is shown in biting engagement with the stalk 18 for causing downward movement of the stalk and an eventual snapping of the ear of corn 23. The rolls 10 and 11 turn inwardly toward each other so that the stalk 18 tends to be forced down between the rolls. The projections located between adjacent convolutions of the spiral ribs 14 and 15, are alternately spaced so that only one projection enters the pocket 17 at a time and thus engages the stalk on only one side thereof. This insures that the stalk shall not be completely crushed and broken off with an entire loss of corn such as occurs quite frequently in presently used corn snapping rolls. This alternate engagement of the stalk 18 by the biting feeding lugs and the engagement of the stalk on alternately opposite sides at spaced vertical intervals effectively feeds the stalk downwardly and causes a quick snapping of the ear 23 from its attachments at 24 to the stalk 18.

The spiral ribs 14 and 15 in the present invention include channels 25 and 26 respectively which are integrally molded to the cylindrical portions 12 and 13 of the rolls 10 and 11. The channels 25 and 26 each are provided with substantially V-shaped openings 27 and 28 within which correspondingly V-shaped rubber strips 29 and 30 are positioned. The rubber strips 29 and 30 are very similar to a rubber V-belt material and project radially outwardly beyond the outer surface of the spiral channels 25 and 26 so that the operating portions of the ribs are substantially entirely rubber.

As previously stated, the mating ribs forming the pockets 17 cause the forwarding of the stalk along the rolls. The lugs 19, 20, 21 and 22 positively grip the stalk at alternate positions and feed the stalk downwardly between the rolls simultaneously with the feeding of the stalk along the rolls. When the ear of corn 23 arrives at the juncture between the rolls it is sufficiently large so that it will not pass through the rolls and thus it is snapped from the stalk, whereupon it lies in a position centrally of the rolls and over the cooperative mating spiral ribs 14 and 15. The rubber surfaces 29 and 30 of the ribs are adapted to remove trash and to grip and/or pinch the husks on the ear and the downward pulling away from the ear causes the husks to be removed. It is thus seen that in addition to effectively performing the snapping operation the rolls of the present invention with the spiral rubber inserts actively husks the ears and permit elimination of separate husking rolls and thus a more economical corn picker.

Numerous details of construction may be varied throughout a wide range without departing from the principles disclosed herein and I therefore do not propose limiting the patent granted hereon otherwise than as necessitated by the appended claim.

What is claimed is:

A pair of cooperative snapping and husking rolls comprising elongated parallel cylindrical portions, oppositely wound mating spiral ribs attached to and extending over the cylindrical surface of both of the cooperative rolls, said spiral ribs having their convolutions spaced apart to form a corn stalk confining pocket, and resilient means associated with said spiral ribs adapted to provide a yieldable outer surface for said ribs in cooperation with each other, said spiral ribs including spiral channel members and rubber strips filling said spiral channel members and extending radially outwardly therefrom.

JOHN L. AASLAND.

REFERENCES CITED

The following references are of record in the file of this patent:

UNITED STATES PATENTS

| Number | Name | Date |
| --- | --- | --- |
| 381,748 | Armstead | Apr. 24, 1888 |
| 787,750 | Goodhue | Apr. 18, 1905 |
| 867,035 | Hamm | Sept. 24, 1907 |
| 959,904 | Wolfe | May 31, 1910 |
| 1,641,682 | Kruse | Sept. 6, 1927 |
| 1,682,143 | Paradise | Aug. 28, 1928 |
| 1,859,800 | Schwartz | May 24, 1932 |
| 2,041,139 | Marxman | May 19, 1936 |
| 2,179,579 | Morral et al. | Nov. 14, 1939 |